United States Patent
Zohar et al.

(10) Patent No.: US 7,596,670 B2
(45) Date of Patent: Sep. 29, 2009

(54) RESTRICTING ACCESS TO IMPROVE DATA AVAILABILITY

(75) Inventors: Ofir Zohar, Alfe-Menashe (IL); Haim Helman, Ramat Gan (IL); Efri Zernier, Kiryat Mozkin (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 11/290,274

(22) Filed: Nov. 30, 2005

(65) Prior Publication Data

US 2007/0124555 A1    May 31, 2007

(51) Int. Cl.
    *G06F 12/00* (2006.01)
(52) U.S. Cl. ....................................... 711/163
(58) Field of Classification Search .................. 711/163
    See application file for complete search history.

(56) References Cited

U.S. PATENT DOCUMENTS

| | | | |
|---|---|---|---|
| 6,457,102 B1 | 9/2002 | Lambright et al. | |
| 6,836,785 B1* | 12/2004 | Bakshi et al. | 709/203 |
| 6,886,074 B1* | 4/2005 | Narayanaswamy et al. | 711/114 |
| 7,155,716 B2* | 12/2006 | Hooman et al. | 718/102 |
| 7,243,200 B2* | 7/2007 | Day et al. | 711/163 |
| 2006/0059568 A1* | 3/2006 | Smith-Mickelson et al. | 726/27 |
| 2006/0206758 A1* | 9/2006 | Butterworth et al. | 714/11 |
| 2006/0224838 A1* | 10/2006 | Blumrich et al. | 711/146 |

OTHER PUBLICATIONS

David Cappers Steere, "Using Dynamic Sets to Reduce the Aggregate Latency of Data Access", School of Computer Science Carnegie Mellon University, Jan. 1997.
Andre Brinkmann et al. "Compact, Adaptive Placement Schemes for Non-Uniform Capacities", Aug. 2002.

* cited by examiner

Primary Examiner—Reginald G Bragdon
Assistant Examiner—Aracelis Ruiz
(74) Attorney, Agent, or Firm—Griffiths & Seaton PLLC

(57) ABSTRACT

I/O requests from hosts in a data storage system are blocked or rate-restricted upon detection of an unbalanced or overload condition in order to prevent timeouts by host computers, and achieve an aggregate reduction of data access latency. The blockages are generally of short duration, and are transparent to hosts, so that host timeouts are unlikely to occur. During the transitory suspensions of new I/O requests, server queues shorten, after which I/O requests are again enabled.

9 Claims, 4 Drawing Sheets

RESTRICTING ACCESS TO IMPROVE DATA AVAILABILITY

BACKGROUND OF THE INVENTION

1. Field of the Invention

This invention relates to data storage. More particularly, this invention relates to aggregate reduction of data access latency in distributed data storage entities.

2. Description of the Related Art

Data storage systems generally store data on physical media in a manner that is transparent to host computers. From the perspective of a host computer, data is stored at logical addresses located on file systems, or logical volumes of the storage system. To function, data storage systems map the logical addresses to addressable physical locations on storage media, such as direct access hard disks. In distributed systems, requests for data accessed may be queued with other requests in one or more queues. Many queueing strategies are known in the art.

The slow access time, of the order of 5-10 ms, for an input/output (I/O) transaction performed on a disk has led to the need for a caching system between a host generating the I/O transaction and the disk. A cache, a fast access time medium, stores a portion of the data contained in the disk. The I/O transaction is first routed to the cache, and if the data required by the transaction exists in the cache, it may be used without accessing the disk.

Using more than one cache and more than one disk can improve access time, and leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system. U.S. Pat. No. 6,457,102; issued to Lambright, et al., whose disclosure is incorporated herein by reference, describes a system for storing data in a cache memory that is divided into a number of separate portions. Exclusive access to each of the portions is provided by software or hardware locks. The system may be used for choosing which data is to be erased from the cache in order to make room for new data.

A data storage system is typically set up to be as evenly loaded as possible, in terms of activity performed by the system elements. Such load balancing enhances the ability of the data storage system to perform efficiently. Methods are known in the art for effecting and maintaining load balancing. An article titled *Compact, Adaptive Placement Schemed for Non-Uniform Capacities*, by Brinkmann et. al., in the Aug., 2002, *Proceedings of the 14$^{th}$ ACM Symposium, on Parallel Algorithms and Architectures* (SPAA); whose disclosure is incorporated herein by reference, describes two strategies for distributing objects among a heterogeneous set of servers. Both strategies are based on hashing systems.

Using more than one cache and more than one disk can improve access time, and leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system. U.S. Pat. No. 6,457,102; issued to Lambright, et al., whose disclosure is incorporated herein by reference, describes a system for storing data in a cache memory that is divided into a number of separate portions. Exclusive access to each of the portions is provided by software or hardware locks. The system may be used for choosing which data is to be erased from the cache in order to make room for new data.

A data storage system is typically set up to be as evenly loaded as possible, in terms of activity performed by the system elements. Such load balancing enhances the ability of the data storage system to perform efficiently. Methods are known in the art for effecting and maintaining load balancing. An article titled Compact, Adaptive Placement Schemed for Non-Uniform Capacities, by Brinikmann et. al., in the August, 2002, Proceedings of the 14$^{th}$ ACM Symposium, on Parallel Algorithms and Architectures (SPAA); whose disclosure is incorporated herein by reference, describes two strategies for distributing objects among a heterogeneous set of servers. Both strategies are based on hashing systems.

SUMMARY OF THE INVENTION

There have been a number of proposals to reduce data access latency by prefetching data based on guesses of future accesses, as described in the document Using Dynamic Sets to Reduce the Aggregate Latency of Data Access; Steere, D.C., School of Computer Science; Carnegie Mellon University; Pittsburgh, Pa., 15213. In structured environments, these guesses can be reasonably accurate and result in performance improvements. However, the penalty of inaccurate predictions is overutilization of I/O resources. Indeed, faulty predictions can be counterproductive, leading to degradation of performance.

Imbalances and overload among the disks are more likely to occur when storage disks in a system vary in their capabilities and response times. It is an advantage of some aspects of the present invention that when data having contiguous logical addresses are distributed among storage units in hardware systems, host timeouts are avoided when there is exceptional delay in servicing I/O requests, for example when the storage units have different performance characteristics and cannot be easily synchronized.

The invention provides a computer-implemented method for operating a data storage system, which has a plurality of memory caches linked to physical storage units, and in which there are enqueued requests for access to the physical storage units. The storage system is coupled to at least one host that requires access to the storage units. The method is carried out by detecting a condition affecting one of the physical storage units, wherein a volume of pending access requests for the one physical storage unit exceeds a first threshold value. Responsively to the detection of the condition, the method is further carried out by imposing a restriction on new requests for access to the storage system by the at least one host, thereafter determining that the volume of pending access requests has fallen below a second threshold value, and responsively to the determination, removing the restriction.

According to one aspect of the method, the volume is measured as a number of enqueued requests for access to the one physical storage unit.

According to another aspect of the method, the volume is measured as a distribution of the enqueued requests for access to the physical storage units.

According to yet another aspect of the method, the volume is measured as an estimated service time of the enqueued requests for access to the one physical storage unit.

According to a further aspect of the method, the volume is measured as a distribution of estimated service times of the enqueued requests for access to the physical storage units.

According to still another aspect of the method, the restriction is a stoppage of the new requests for access to the physical storage units.

According to an additional aspect of the method, the restriction is a limitation on a rate of accepting new requests for access to the physical storage units.

According to yet another aspect of the method, the restriction is imposed by establishing an alternating sequence of blocking intervals and non-blocking intervals.

According to still another aspect of the method, the restriction is imposed by accepting only a predetermined proportion of the new requests for access to the physical storage units.

One aspect of the method is carried out after performing removing the restriction by avoiding imposition of a subsequent restriction on the new requests for access for a predetermined delay interval.

A further aspect of the method includes providing a plurality of network interfaces, wherein the storage system is coupled to the at least one host via the network interfaces, and monitoring new requests for access to the physical storage units passing through the network interfaces, wherein detecting the condition, imposing and removing the restriction are performed independently by the network interfaces.

The invention provides a data storage system coupled to at least one host including a plurality of physical storage units, a plurality of memory caches linked to respective ones of the physical storage units in which there are enqueued requests for access to the physical storage units, and a management module operative for detecting a condition affecting one of the physical storage units, wherein a volume of the enqueued requests for access to the one physical storage unit exceeds a first threshold value. Responsively to detection of the condition, the management module is operative for imposing a restriction on new requests for access to the physical storage units, thereafter determining that the volume has fallen below a second threshold value, and responsively to the determination, removing the restriction.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

System Overview.

Figure 1:
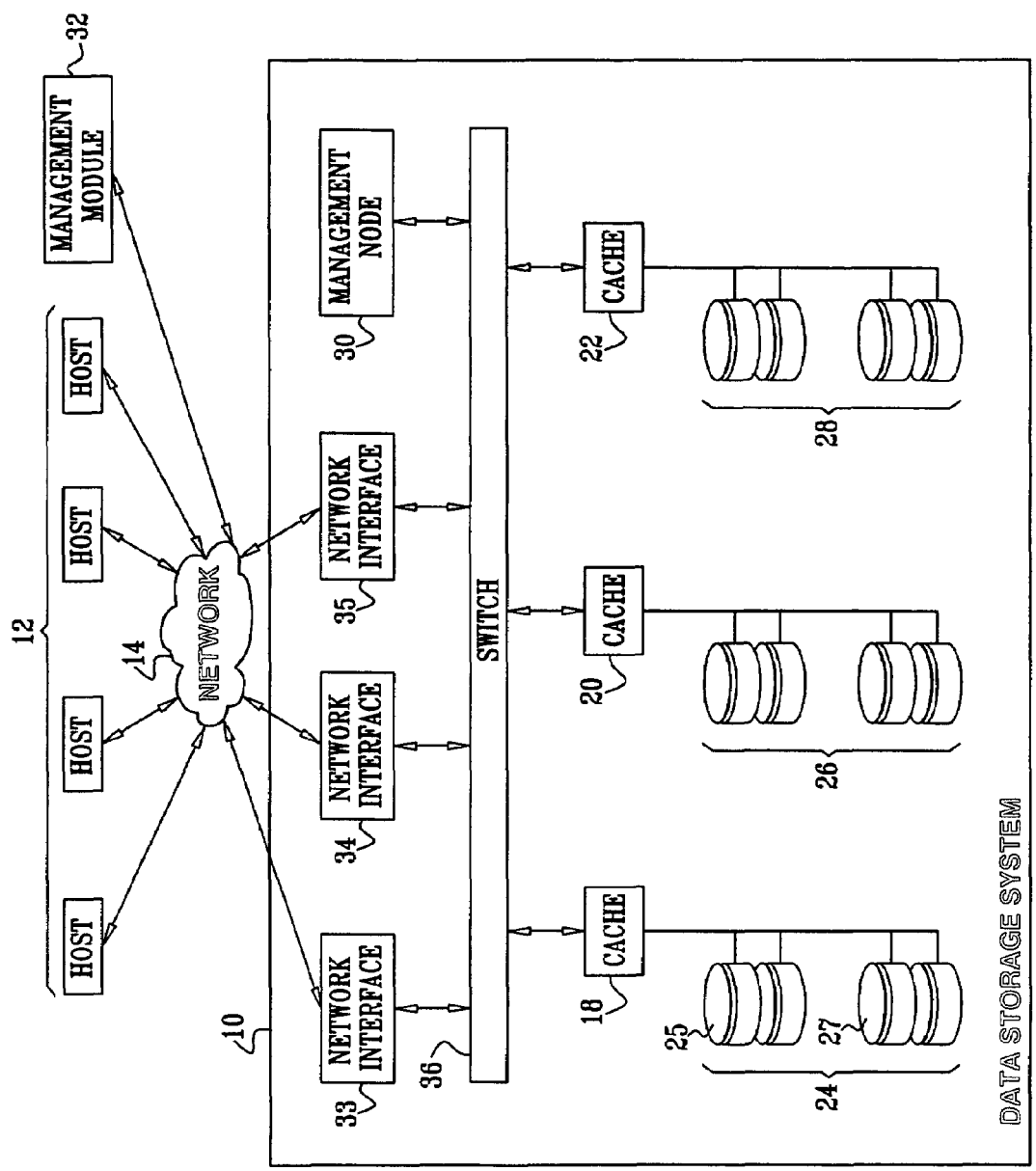
FIG. 1 is a block diagram of a storage system, in accordance with a disclosed embodiment of the invention.

Turning now to the drawings, reference is initially made to FIG. 1, which is a block diagram of an exemplary storage system 10, in accordance with a disclosed embodiment of the invention. The particular system shown in FIG. 1 is presented to facilitate an explanation of the invention. However, the invention can be practiced, mutatis mutandis, using other storage systems with diverse architectures and capabilities.

The storage system 10 receives, from one or more host computers 12, I/O requests, which are commands to read or write data at logical addresses on logical volumes. Any number of host computers 12 are coupled to the storage system 10 by any means known in the art, for example, using a network. Herein, by way of example, the host computers 12 and the storage system 10 are assumed to be coupled by a network 14. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume V1. The storage system 10 typically operates in, or as, a network attached storage (NAS) or a storage area network (SAN) system.

The storage system 10 comprises one or more caches, indicated as caches 18, 20, 22. However, it will be appreciated that the number of caches used in the storage system 10 may be any convenient number. While all caches in the storage system 10 may operate in substantially the same manner and to comprise substantially similar elements, this is not a requirement. Each of the caches is typically, but not necessarily approximately equal in size and is assumed to be coupled, by way of example, in a one-to-one correspondence with a set of physical storage units, which are typically disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference. Each set of physical storage comprises multiple slow and/or fast access time mass storage devices, hereinbelow assumed to be multiple hard disks. FIG. 1 shows the caches 18, 20, 22 coupled to respective sets of physical storage 24, 26, 28. Typically, the sets of physical storage 24, 26, 28 comprise one or more disks 25, 27, which can have different performance characteristics. In response to an I/O command, the cache 18, by way of example, may read or write data at addressable physical locations of physical storage 24. In the embodiment of FIG. 1, the caches 18, 20, 22 are shown to exercise certain control functions over the physical storage 24, 26, 28. These control functions may alternatively be realized by hardware devices such as disk controllers, which are linked to the caches.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the management node 30 to one or more generally similar network interfaces 33, 34, 35 of the storage system 10. While three network interfaces are shown in FIG. 1, it will be understood that the storage system 10 may comprise any convenient number of network interfaces. Subsequent to the formation of the volume V1, the network interfaces 33, 34, 35 receive I/O commands from the host computers 12 specifying logical addresses of the volume V1. The network interfaces use the routing records to break the commands into I/O instructions, or command subsets, that are then distributed among the caches 18, 20, 22.

The management module 32 is operative to monitor the state of the system generally, including the states of the caches 18, 20, 22 and to transmit configuration information to other components of the storage system 10 for example, configuration changes that result in blocking intervals, or limit the rate at which I/O requests for the sets of physical storage 24, 26, 28 are accepted, as explained in further detail hereinbelow.

Routing of commands and data from the network interfaces 33, 34, 35 to each cache is typically performed over a network and/or a switch. Herein, by way of example, the network interfaces are assumed to be coupled to the caches by a switch 36, which can be of any known type having a digital cross-connect function.

Data having contiguous logical addresses are generally distributed among the disks. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a storage area network or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks. The present invention enables improved throughput in a storage system by avoiding host timeouts caused by uneven activity of components in the system, and in particular by uneven levels of activity among disks.

Preferably, the storage system 10 generates and distributes even and sufficiently fine spreading of logical block addresses among the caches 18, 20, 22 in order to achieve well-balanced cache loading. This may be accomplished using the methods described in commonly assigned U.S. Patent Application Publication No. 2005/0015567, entitled "Distributed Independent Cache Memory", whose disclosure is herein incorporated by reference. Alternatively, the invention may be practiced in storage systems that do not maintain balanced cache loading.

Figure 2:
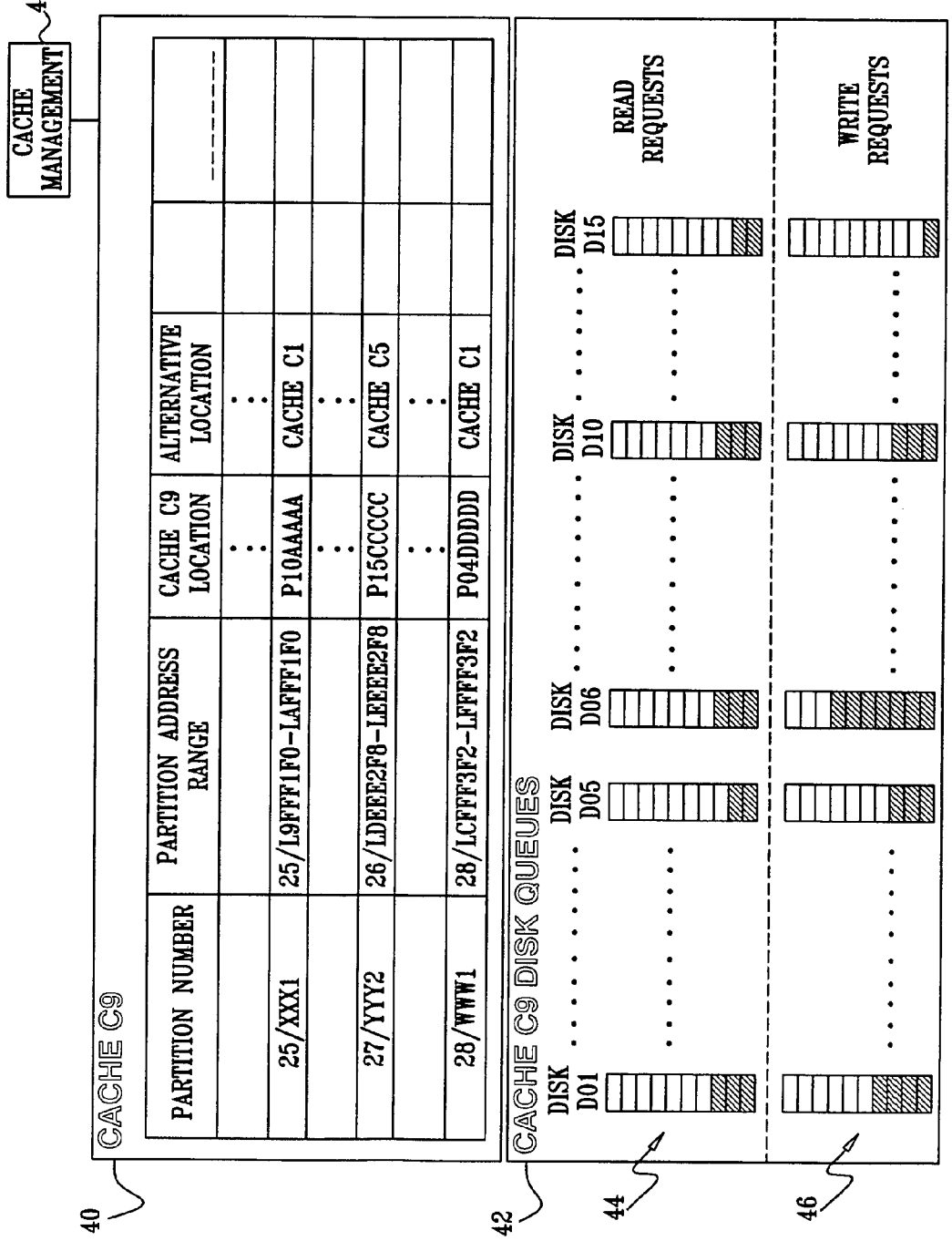
FIG. 2 is a block diagram of a cache in the storage system shown in FIG. 1 in accordance with a disclosed embodiment of the invention.

Reference is now made to FIG. 2, which is a block diagram of a representative cache 40 in the storage system 10 (FIG. 1), in accordance with a disclosed embodiment of the invention. In order to service its I/O requests, the cache 40 maintains a set 42 of I/O request queues, comprising I/O read request queues 44 and I/O write request queues 46. There is one I/O read request queue and one I/O write request queue for each disk connected to the cache 40. Alternatively, the set 42 may comprise one combined I/O request queue for each disk, the combined queue having both I/O read and I/O write requests. In any case, I/O requests are placed in the appropriate queue in each cache, and the I/O requests are transmitted from the queues to the appropriate disks, as the latter become available to receive a request. In practice, the cache 40 may also contain other objects, which are not directly relevant to the present invention. These may include, inter alia, communication modules, LRU modules, data space, etc. Operations relating to these objects are typically managed by a cache management module 48.

Figure 3:
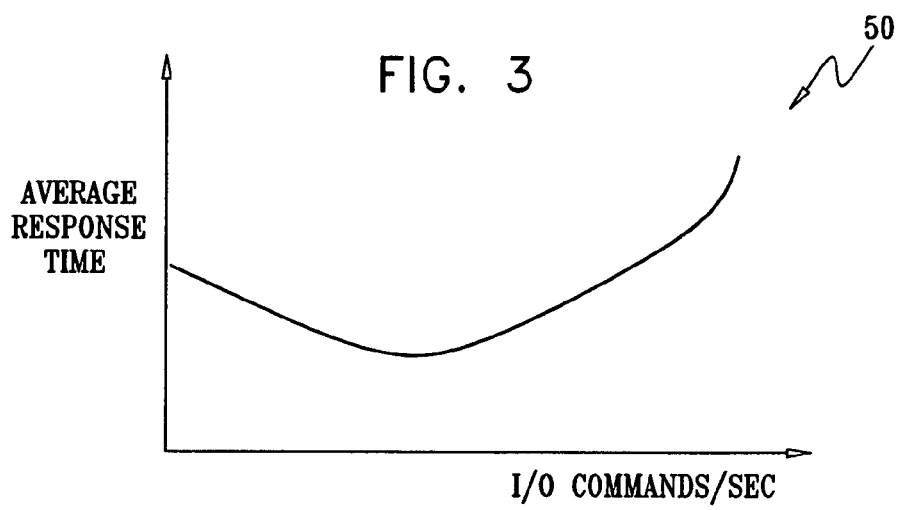
FIG. 3 is a graph that plots average response time against I/O commands in a storage system suitable for use with a disclosed embodiment of the invention.

Reference is now made to FIG. 3, which is a graph 50 of average response time against the number of I/O commands. As the queues of the sets of physical storage 24, 26, 28 (FIG. 1) lengthen, the average system response time initially improves, but eventually degrades.

It will be recalled that the caches 18, 20, 22 serve respective sets of physical storage 24, 26, 28. The queue of each cache contains requests for different disks in its respective set of physical storage, which may be equal in performance. Alternatively, the different disks could comprise both slow and fast disks. In any case, the disks are serviced in turn, according to the queue discipline currently in force. As a queue lengthens, some disks, e.g., slower disks, become bottlenecks, and other disks, e.g., faster disks, are starved. For example, the average system response time may be 2 ms under optimal conditions, with about five I/O commands in each queue. The response time increases when some disks become backlogged. Typically, the system response time may increase to 2 sec when one of the queues has grown to 1000.

The inventors have found that an effective way of dealing with intense load conditions that threaten to stall operation of the storage system 10 (FIG. 1) is to transiently prevent I/O requests from the host computers 12 from being enqueued in the caches 18, 20, 22. Time intervals during which I/O requests are blocked are referred to herein as "blocking intervals". Time intervals during which I/O requests are accepted are sometimes referred to herein as "non-blocking intervals". During blocking intervals, new I/O requests arriving from the host computers 12 are not accepted.

During blocking intervals, the I/O read request queues 44 and the I/O write request queues 46 continue to be serviced and empty out. Once the I/O write request queues 46 have reached a predetermined state, blocking intervals are discontinued, and I/O requests from the host computers 12 are again accepted.

Aggregate data access latency may increase over relatively short time frames that include blocking intervals. However, when measured over longer time intervals, the insertion of temporary blocking intervals reduces aggregate data access latency. Even more importantly, the insertion of temporary blocking intervals avoids timeouts by the host computers 12, which would otherwise be likely to occur. As is well known in the art, timeouts and disconnection of the host computers 12, resulting from lack of service, are generally undesirable.

Operation.

Figure 4:
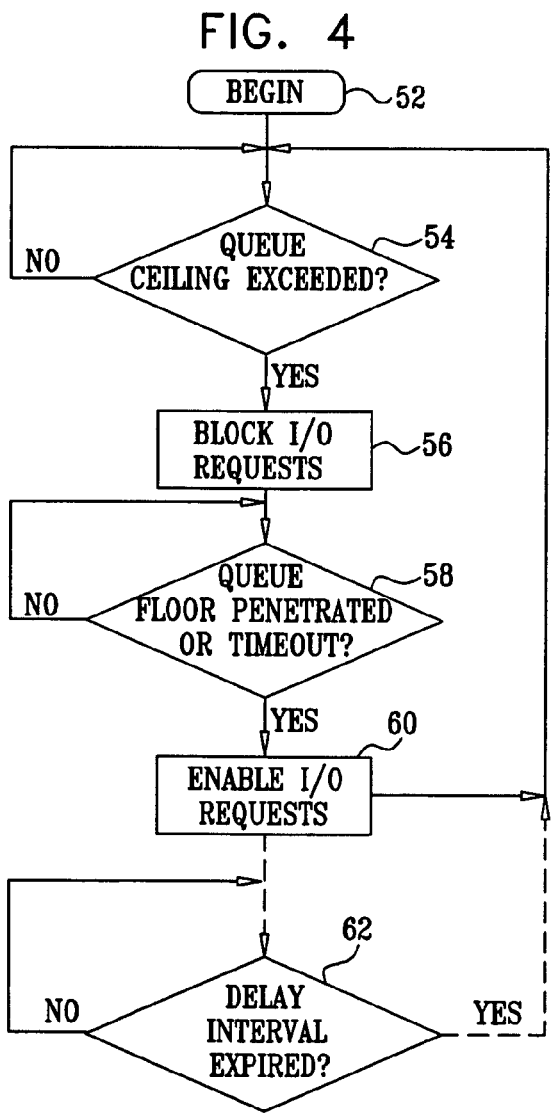
FIG. 4 is a flow chart illustrating a method of restricting access to a storage system in accordance with a disclosed embodiment of the invention.

Reference is now made to FIG. 4, which is a flow chart illustrating a method of restricting access to a storage system, in accordance with a disclosed embodiment of the invention. Operation of the storage system begins at initial step 52. Host computers are connected to the storage system as described above with reference to FIG. 1.

Control now proceeds to delay step 54, where it is determined if an unbalanced condition is present or impending, wherein at least one server is overloaded by I/O access requests. In general, the condition is detected when a level of demand, manifested by a volume of pending access requests, exceeds a threshold value. In some embodiments, the condition is detected by observing that a metric reflecting the volume of pending access requests, such as a queue length in at least one cache exceeds a threshold. For instance, in the embodiment of FIG. 1, an indication of an unbalanced condition is transmitted to the network interfaces 33, 34, 35, which can then effect a blocking interval. Alternatively, the volume of pending access requests may be estimated by evaluating the queue length distribution of the disk caches of the system and detecting outliers. In other embodiments, the distribution of the estimated service time of currently enqueued requests may be evaluated. Alternatively, an unbalanced condition can be detected when the estimated service time of enqueued requests on one of the queues exceeds a threshold. In any case, an overload or unbalanced condition is indicated when the chosen metric exceeds a predetermined ceiling value or otherwise violates a threshold.

After completion of delay step 54, at step 56 a stoppage is imposed on all new I/O requests for the storage system from host computers, thereby initiating a blocking interval. However, as noted above, currently enqueued requests continue to be serviced.

Control now proceeds to delay step 58, where it is determined if the metric chosen in delay step 54 has fallen below a predetermined floor value, or if a timeout interval has been exceeded. The blocking interval begun in step 56 continues until conditions of delay step 58 are met.

After completion of delay step 58, at step 60 new I/O requests are re-enabled and allowed to be enqueued in the caches of the storage system. Control thereupon returns to delay step 54 to begin a new iteration of the method. In some embodiments an optional delay step 62 (indicated by a broken line in FIG. 4) is inserted after step 60 in order to prevent a new blocking interval from being established too quickly after termination of the preceding blocking interval.

Alternate Embodiment 1

In one embodiment of the invention, I/O requests are not completely blocked when an unbalanced or overload condition is detected. Rather the rate at which I/O requests are accepted is limited. The rate limitation can be constant. Alternatively, the rate limitation may be adaptive, depending on the degree of unbalance or overload. In any case, the rate limitation persists until the unbalanced or overload condition is alleviated.

Rate limitation may be implemented by rapid alternation of short blocking intervals that are separated by intervals in which I/O requests are accepted. The intervals can be configured adaptively to the degree of imbalance or overload, or can be constant, in accordance with a predetermined policy. For example, a network interface could enforce a repeating sequence comprising a blocking interval of 1 sec, followed by a 10 ms non-blocking interval in which I/O requests are accepted. The host computers 12 (FIG. 1) see some results of their requests, which prevents timeouts from occurring.

Alternatively, rate limitation can be implemented by simply blocking a proportion of I/O requests and accepting the remainder.

Figure 5:
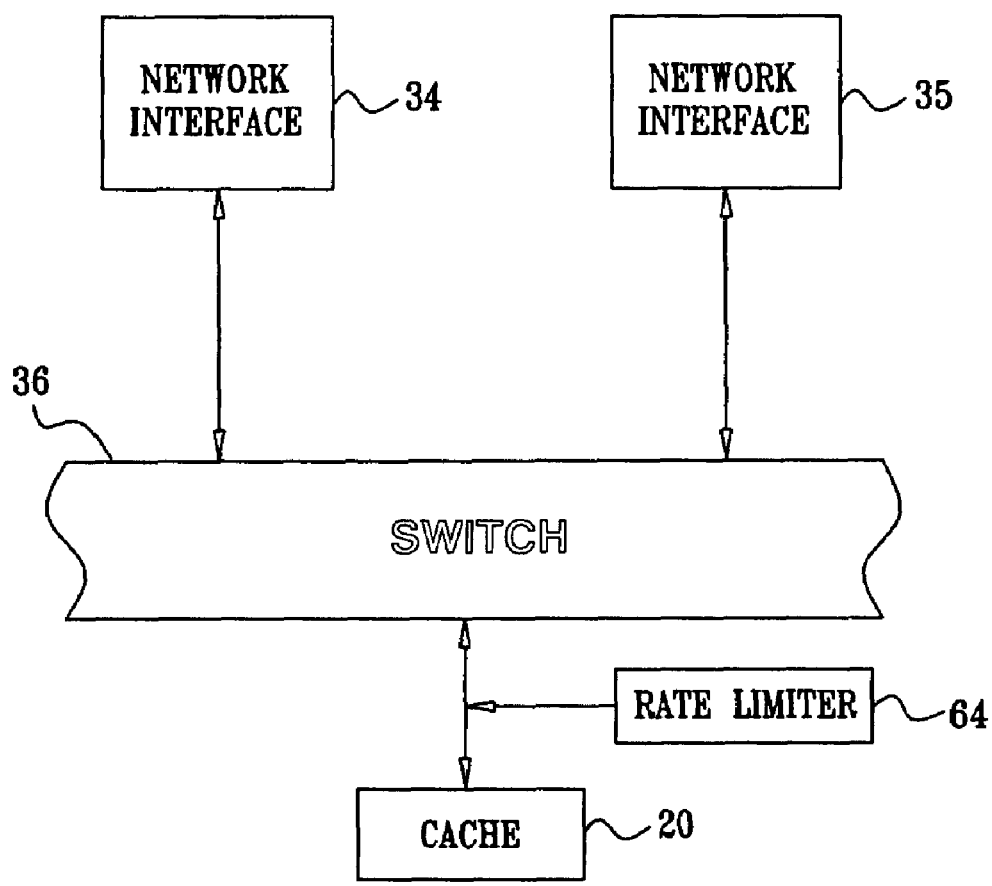
FIG. 5 is a block diagram of a control system in the storage system shown in FIG. 1 for limiting the rate at which I/O requests are accepted in a storage system in accordance with an alternate embodiment of the invention.

Reference is now made to FIG. 5, which is a block diagram of a portion of the storage system 10 (FIG. 1) illustrating a control system for limiting the rate at which I/O requests are accepted in accordance with an alternate embodiment of the invention. The arrangement shown in FIG. 5 is similar to that the first embodiment. However, the I/O blocking mechanism is replaced by a rate-limiting module 64 that restricts the rate of I/O requests reaching the caches 18, 20, 22 (FIG. 1). The rate-limiting module 64 can be implemented as a software program, or as equivalent hardware, as is known in the art.

Alternate Embodiment 2

It will be recalled from the discussion of FIG. 4 that conditions of imbalance or overload are reported to network interfaces. Referring again to FIG. 1, in this embodiment conditions of imbalance are not dealt with globally as described above. Rather, blocking intervals are enforced selectively only by those network interfaces 33, 34, 35 that are receiving I/O requests that need to be enqueued in caches of affected storage units. All other network interfaces continue to function normally. For example, assume that an unbalanced or overload condition affects the set of physical storage 24, but does not affect the sets of physical storage 26, 28. The network interface 33 is receiving I/O requests from some of the host computers 12 that require I/O access to the set of physical storage 24. The network interfaces 34, 35 are not receiving I/O requests requiring access to the set of physical storage 24. In this circumstance blocking intervals, according to any of the variations described above, will be imposed by the network interface 33, but not by the network interfaces 34, 35.

I/O requests are monitored by the network interfaces 33, 34, 35 individually. Conditions of imbalance are detected by each network interface independently according to a metric. For example the estimated average of service times for pending I/O requests passing through a network interface for each storage unit can be continuously computed independently by the respective network interfaces. Most preferably, the metric is the maximal individual service time of currently pending requests. Using this method, the network interfaces 33, 34, 35 can detect conditions of imbalance without regard to signals from the caches 18, 20, 22 or their associated cache management modules.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A computer-implemented method for operating a data storage system having a plurality of memory caches linked to physical storage units and having enqueued requests for access to said physical storage units, said storage system being coupled multiple hosts, comprising the steps of:

detecting a condition affecting one of said physical storage units, wherein a volume of pending access requests for access to said one physical storage unit exceeds a first threshold value;

responsively to said step of detecting imposing a restriction on new requests for access to said storage system by the multiple hosts, the restriction comprising limiting a rate of acceptance of the new requests by establishing an alternating sequence of blocking intervals and non-blocking intervals for the new requests from all the hosts, wherein a blocking period of the blocking intervals and a non-blocking period of the non-blocking intervals are configured to prevent timeouts for all the hosts;

thereafter determining that said volume has fallen below a second threshold value; and responsively to said step of determining, removing said restriction.

2. The method according to claim 1, wherein said volume is measured as a number of said enqueued requests for access to said one physical storage unit.

3. The method according to claim 1, wherein said volume is measured as a distribution of said enqueued requests for access to said physical storage units.

4. The method according to claim 1, wherein said volume is measured as an estimated service time of said enqueued requests for access to said one physical storage unit.

5. The method according to claim 1, wherein said volume is measured as a distribution of estimated service times of said enqueued requests for access to said physical storage units.

6. The method according to claim 1, further comprising the step of after performing said step of: removing said restriction, avoiding imposition of a subsequent restriction on said new requests for access to said physical storage units for a predetermined delay interval.

7. The method according to claim 1, further comprising the steps of:

providing a plurality of network interfaces, said storage system being coupled to said multiple hosts via said network interfaces; and monitoring said new requests for access to said physical storage units passing through respective said network interfaces, wherein said steps of detecting, imposing a restriction, and removing said restriction are performed independently by said network interfaces responsively to said step of monitoring.

8. The method according to claim 1, wherein the volume of the enqueued requests and the first threshold value by a measured overload, and wherein the blocking period and the non-blocking period are configured in response to the measured overload.

9. A method for operating a data storage system having a plurality of memory caches linked to physical storage units and having enqueued requests for access to said physical storage units, said storage system being coupled to multiple hosts, comprising the steps of:

detecting a condition affecting one of said physical storage units including detecting a difference between a volume of the enqueued requests for access to said one physical storage unit and an average volume of pending requests for all of the physical storage units, wherein the difference exceeds a first threshold value;

responsively to said step of detecting, imposing a restriction on new requests for access to said storage system by the multiple hosts, by establishing an alternating sequence of blocking intervals and non-blocking intervals for all the hosts, wherein a blocking period of the blocking intervals and a non-blocking period of the non-blocking intervals are configured responsively to the difference;

thereafter determining that said difference has fallen below a second threshold value; and responsively to said step of determining, removing said restriction.

* * * * *